Sept. 23, 1952 C. A. NAUGHTON 2,611,800
WIRING SYSTEM OF CONDUCTORS PERMANENTLY EMBEDDED IN INSULATION
Filed March 8, 1950 6 Sheets—Sheet 1
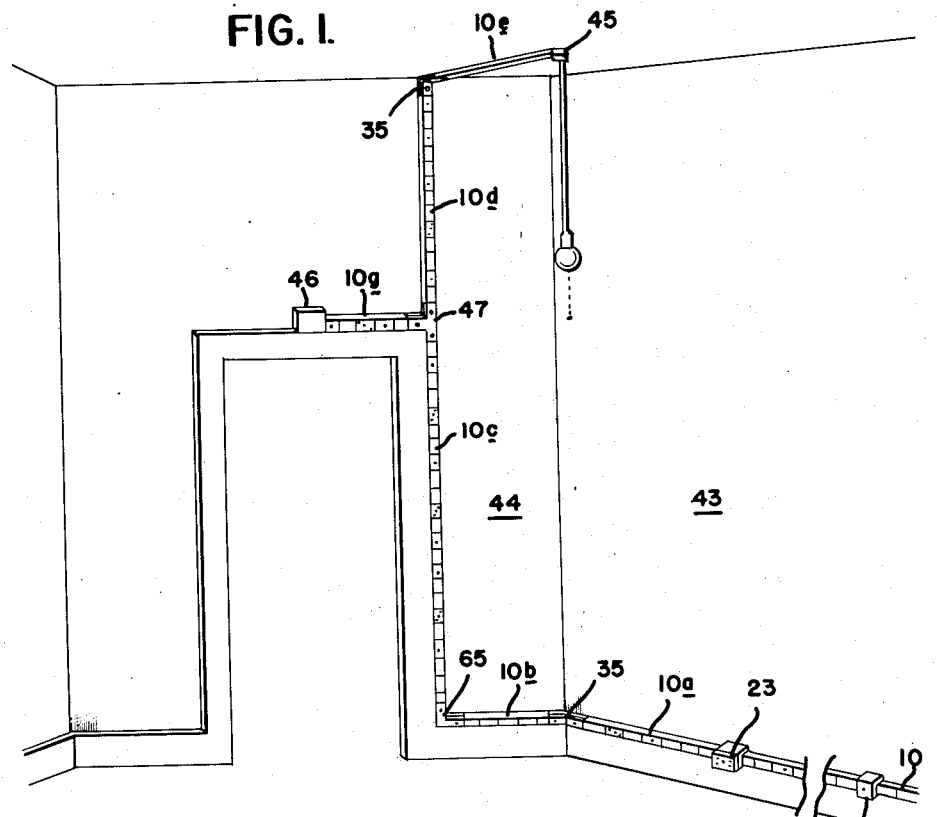
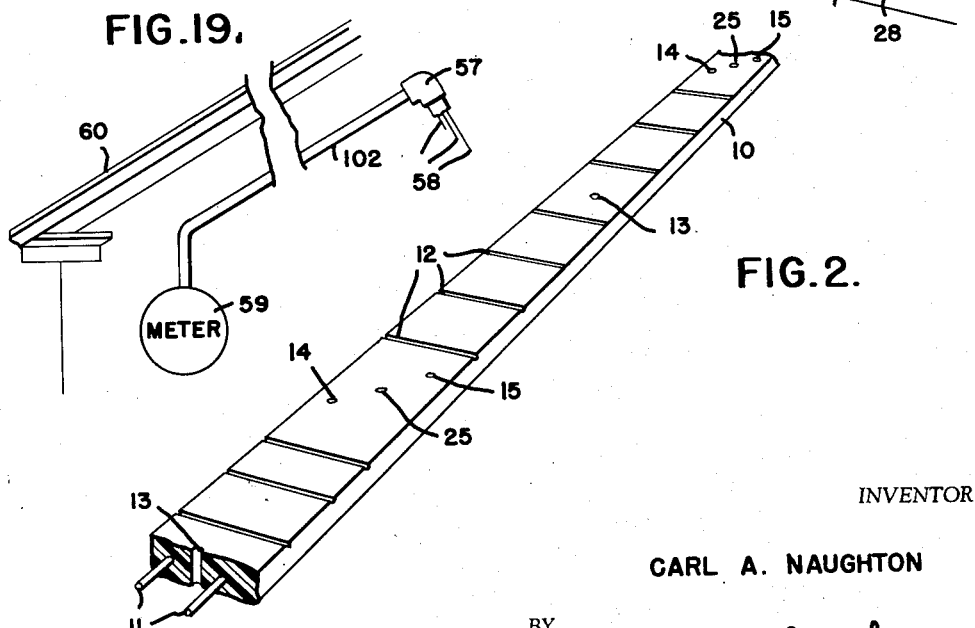
INVENTOR
CARL A. NAUGHTON
BY Mawhinney & Mawhinney
ATTORNEYS Sept. 23, 1952 — C. A. NAUGHTON — 2,611,800
WIRING SYSTEM OF CONDUCTORS PERMANENTLY EMBEDDED IN INSULATION
Filed March 8, 1950 — 6 Sheets-Sheet 2
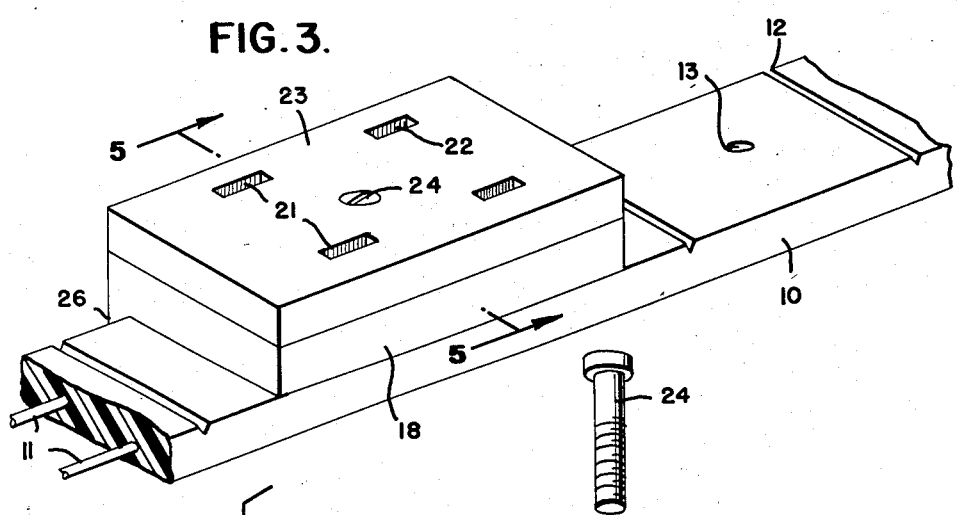
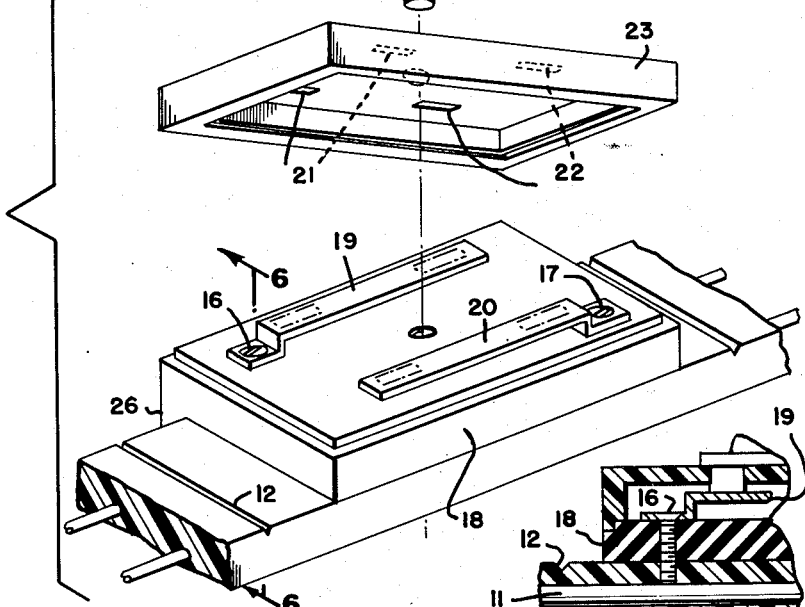
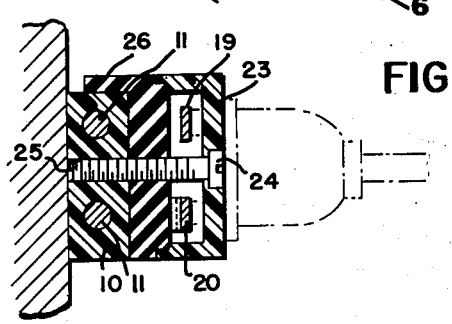
INVENTOR
CARL A. NAUGHTON
BY Mawhinney + Mawhinney
ATTORNEYS Sept. 23, 1952          C. A. NAUGHTON          2,611,800
WIRING SYSTEM OF CONDUCTORS PERMANENTLY EMBEDDED IN INSULATION
Filed March 8, 1950          6 Sheets-Sheet 3
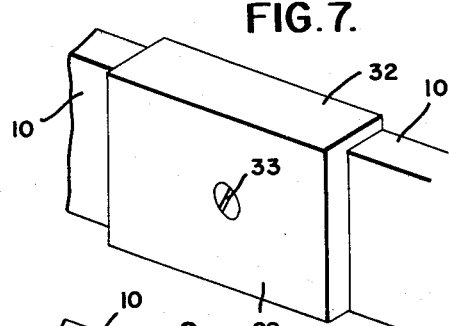
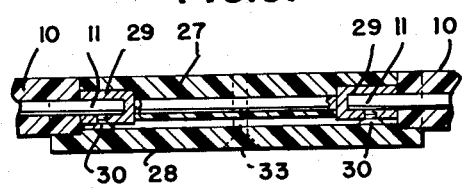
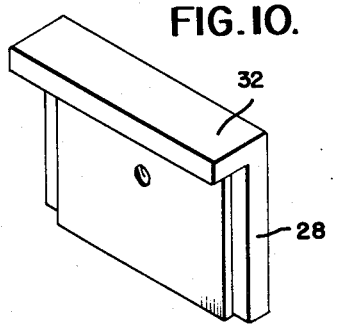
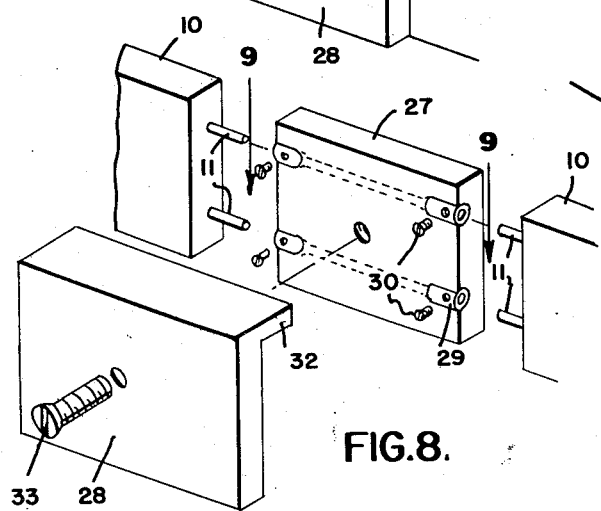
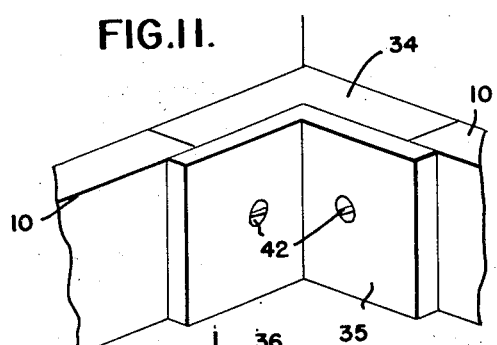
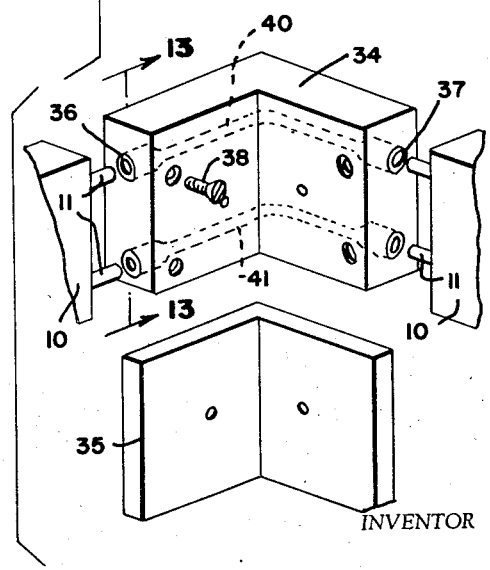
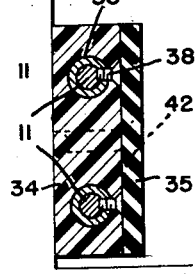
INVENTOR
CARL A. NAUGHTON
BY Mawhinney & Mawhinney
ATTORNEYS

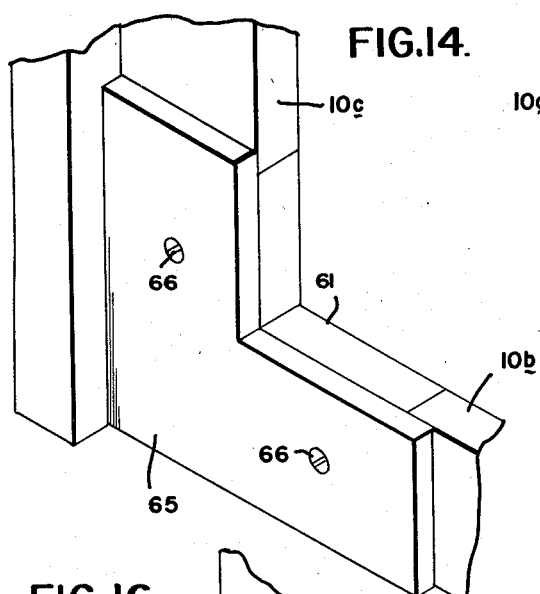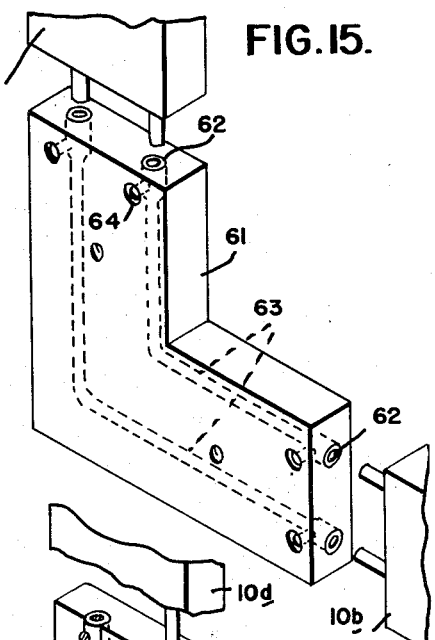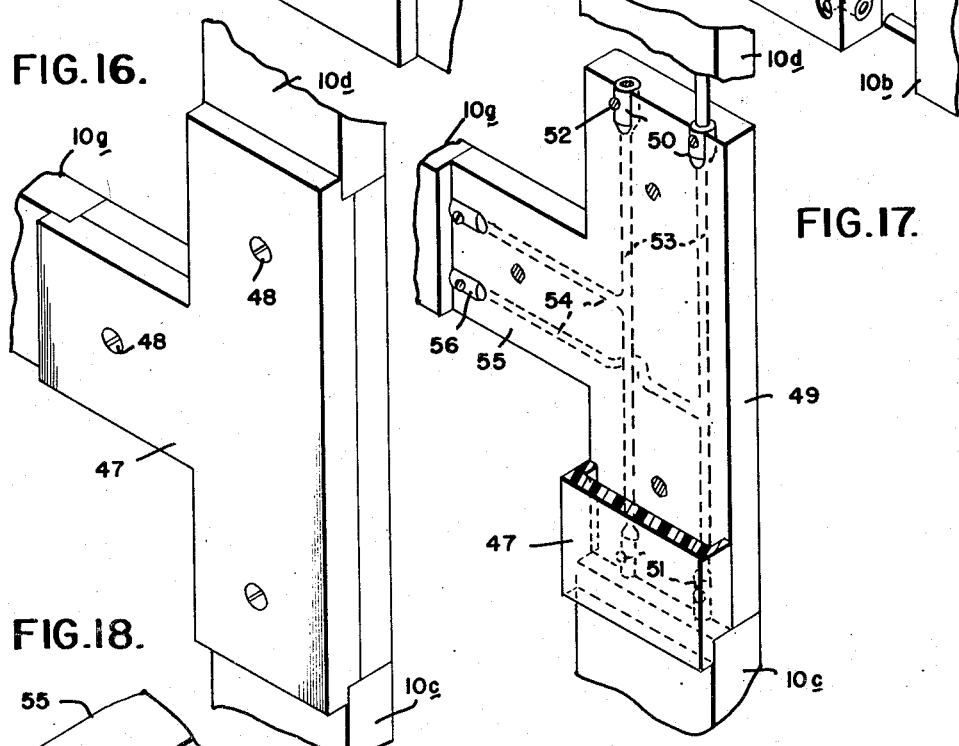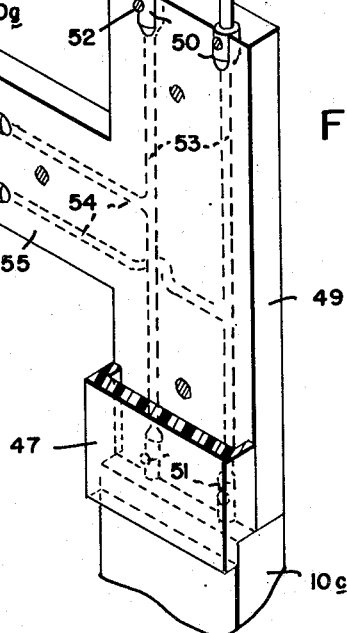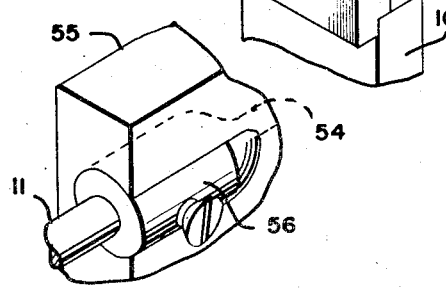

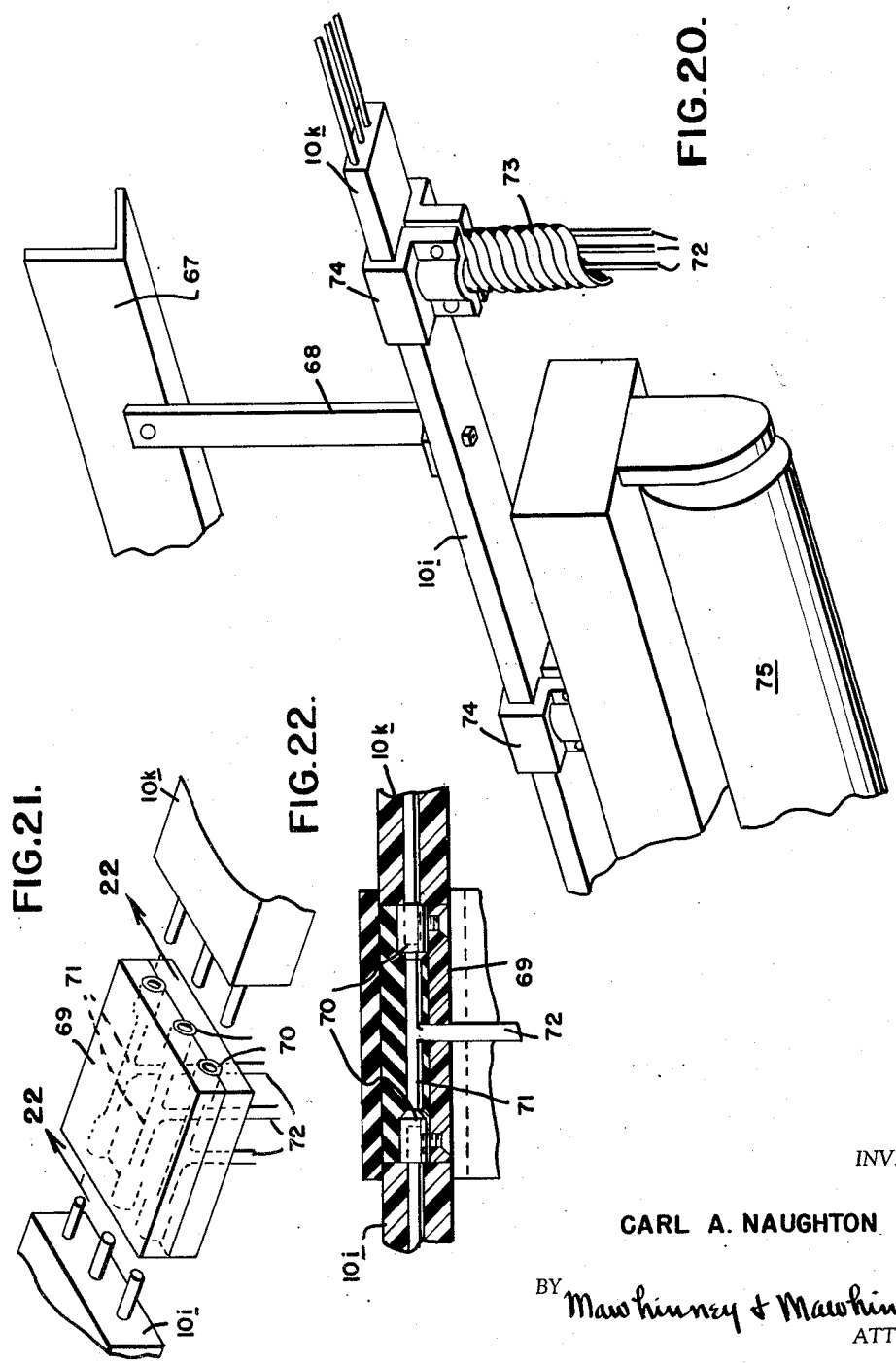

*INVENTOR*

CARL A. NAUGHTON

BY Mawhinney & Mawhinney

ATTORNEYS

Patented Sept. 23, 1952

2,611,800

UNITED STATES PATENT OFFICE 2,611,800

WIRING SYSTEM OF CONDUCTORS PERMANENTLY EMBEDDED IN INSULATION

Carl A. Naughton, Sandston, Va.

Application March 8, 1950, Serial No. 148,335

5 Claims. (Cl. 173—334.1)

The present invention relates to improvements in wiring system of conductors permanently embedded in insulation with matching connectors and convenience outlets and other devices which provide an improved system whereby molding may have improved and extensive uses.

An object of the invention is to provide an improved construction of conduit moulding in which rigid, hard plastic provides the moulding in which two or more electric conductors are embedded, which moulding may be provided in suitable lengths to the end that the same is readily adaptable to both indoor and outdoor use for the purpose of obtaining power for convenience or other outlets at any point along the line of the moulding.

A further object of the invention is to provide a non-inflammable electrically non-conducting plastic moulding in which are embedded two or more electric conductors with provisions which enable the plastic to be broken off or sawed through to shorten the same to the length desired, which moulding provides electrical continuity from end to end and provision whereby the same can be tapped into at any selected point without disrupting the service or system.

With the foregoing and other objects in view, the invention will be more fully described hereinafter, and will be more particularly pointed out in the claims appended hereto.

In the drawings, wherein the symbols refer to like or corresponding parts throughout the several views, Figure 1 is a fragmentary perspective view of a room equipped with the novel wiring system according to the present invention.

Figure 2 is a perspective view, with parts broken away and parts in section, of the improved plastic conduit.

Figure 3 is also a perspective view on an enlarged scale showing the conduit and a form of convenience outlet applied thereon.

Figure 4 is an exploded perspective view of the parts of Figure 3.

Figure 5 is a section taken on the line 5—5 of Figure 3.

Figure 6 is a section taken on the line 6—6 of Figure 4.

Figure 7 is a fragmentary perspective view of two sections of conduit joined by a form of connector.

Figure 8 is an exploded perspective view of the parts shown in Figure 7.

Figure 9 is a section taken on the line 9—9 of Figure 8.

Figure 10 is a perspective view of the connector cover plate from the inside thereof.

Figure 11 is a fragmentary perspective view of two sections of conduit joined by a form of angle connector.

Figure 12 is an exploded perspective view of the parts of Figure 11.

Figure 13 is a section taken on the line 13—13 of Figure 12.

Figure 14 is a fragmentary perspective view of two sections of conduit joined by a modified form of angle connector.

Figure 15 is a similar view with the cover removed and the conduit wires disconnected.

Figure 16 is a fragmentary perspective view of three sections of conduit joined by a form of T-connector.

Figure 17 is a similar view with the cover broken away and with parts sectionalized.

Figure 18 is a fragmentary perspective view of a bottom block showing a form of conductor socket.

Figure 19 is a fragmentary perspective view of an example of exterior use.

Figure 20 is a similar view of an example of 3-wire power and adaptation to fluorescent lighting.

Figure 21 is an exploded perspective view of a form of 3-wire connector.

Figure 22 is a section taken on the line 22—22 of Figure 21.

Figure 23:
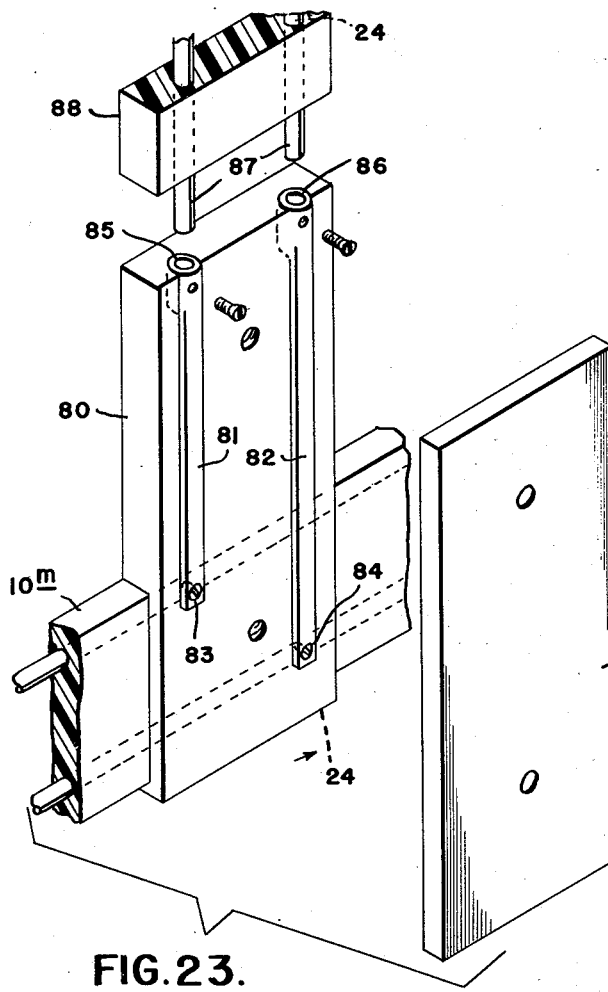
Figure 23 is a fragmentary perspective view showing a section of the conduit or moulding with a device for obtaining power at the regular intervals from the moulding.

Referring more particularly to the drawings, 10 designates a moulding of a plastic or synthetic resin which is rigid and substantially hard such as "Bakelite," "Lucite," "Plexiglas" or any other hard-setting plastic which is fire-resistant or slow-burning and may be flat, concave, convex or of any surface ornamental form. Two or more electric conductors 11 with or without insulation, preferably bare uninsulated conductors are embedded in spaced relation in the plastic moulding and extend longitudinally therealong, such conductors being connected to a source of electric current supply. The conduit moulding thus formed may be supplied in practice in standard lengths, for instance of 10 or 12 feet in length. The moulding 10 is scored transversely by the lines of scoring 12 at suitable intervals to provide planes of cleavage on which the plastic may be broken, as by the use of pliers or other instrument, to reduce the overall length of the section of moulding. Or where a relatively great part of the standard length of the moulding is to be removed the same may be sawed off along the appropriate line of scoring 12 and the plastic then broken back a suitable distance to reveal the ends of the conductors 11 so that they may be coupled to the connector or to an outlet connection.

A conduit moulding of this form is a substitute for present forms of wire mould and conduit and admits of manufacture in much smaller and compact form. For example the depth of the new conduit moulding may be one-half inch and the width three-quarters of an inch so that the moulding is unobtrusive when applied and projects a minimum distance from the wall; or the same admits of being placed flush in the plaster so as to avoid any projection from the wall.

The plastic 10 will receive fastenings such as screws or the like through openings 13 by which the moulding may be secured to a wall or to the other support, it being understood that the electric conductors 11 are spaced sufficiently far apart to admit the fastening screws therebetween without electrical contact.

The improved plastic moulding 10 is formed at suitable longitudinal intervals, say eighteen inches apart, with integral tap-off sections, said sections including pairs of threaded sockets 14, 15 which are practically in alignment with the electric conductors 11 and are adapted to receive binding or other screws or set screws 16 and 17 by which power may be taken off from the lines for service use.

The pairs of threaded sockets 14, 15 are preferably displaced longitudinally with respect to one another along the length of the plastic moulding 10 and the set screws 16 and 17 are carried in like relationship by the bottom block 18 of a convenience outlet, switch or other application. For instance the bottom block 18 may have buss bars 19 and 20 held in place by the set screws 16 and 17 and coupled by the set screws into electrical connection with the conductors 11; these buss bars extending longitudinally of the moulding in spaced relation and beneath the receptacles 21 and 22 in the top block 23. A central screw or other fastening 24 passes through both blocks 23 and 18 and engages in a threaded socket 25 made in the plastic moulding 10 between the electric conductors 11 and also between the sockets 14 and 15.

The bottom wall of the bottom block 18 may be flat or of any other surface formation to take against the exterior surface of the plastic moulding 10. The bottom block 18 may have a flange 26 if desired to engage with an edge of the moulding 10 in order to orient the outlet box upon the moulding for the purpose of bringing the set screws 16 and 17 into proper registry with the threaded sockets 14 and 15 when the outlet box is shifted longitudinally of the moulding to the correct position.

Thus the outlet box may be applied to the moulding at any point where a group of threaded sockets 14, 15 and 25 occur. The service connection may therefore be applied to the moulding at any selected point along the length thereof without the necessity for cutting or breaking into the moulding and without in any way tearing down the moulding or rebuilding the same. Thus the device provides electrical continuity and once the system is in place it is not necessary to move or tear any part of it down in order to obtain power for convenience or other outlets. The system also provides electrical continuity and provides for tapping into the same at any point without disrupting the service or system.

Where the moulding is furnished in standard lengths it will be necessary to fit one or more lengths together and this may be conveniently done by the type of connector illustrated in which bottom and top blocks 27 and 28 are separable and provided with cylindrical conducting sleeve shields 29 therethrough to receive the projecting conductors 11 from opposite moulding sections, the conductors being held in the conducting sleeves 29 by set screws 30. The top block 28 of plastic or other suitable material is fitted over the bottom block 27 and is preferably wider than such bottom block and preferably includes a flange 32 extending across one side of the block 27. This top block 28 is secured to the bottom block 27 by a central screw 33 or other fastening which may take into a wall or other support and which also serves to hold the two blocks 27 and 28 together.

It is preferred that the moulding be formed of that type of plastic which is substantially rigid in order to be resistant to knocks, accidental blows or the like tending to mar or distort the same and consequently such moulding will not be bendable at corners of the wall but it is preferred that a type of elbow connection be provided at such points. This elbow connection is also preferably made of bottom and top blocks 34 and 35 of plastic or other insulating material shaped to the desired angle and having in opposite end branches thereof metallic sockets or socket shields 36 and 37 to receive the projecting wires from opposite angularly related moulding strips 10. The shields or sockets are provided with set screws 38 to bind the ends of the conductors in the angle connector. Conductor strips 40 and 41 are embedded or mounted in the bottom block 34 between the respective metallic sockets 36 and 37 in order to provide continuity of electrical connection between the sockets. The top block 35 will cover and protect these strips 40 and 41 and the metallic sockets and the set screws 38. Central screws 42 or other fastenings bind the two blocks 34 and 35 together and serves to fasten the same to the wall or an appropriate support.

In Figure 1 is illustrated an example of an installation in which lengths of the plastic moulding 10, 10ᵃ, 10ᵇ, 10ᶜ, 10ᵈ, 10ᵉ and 10ᵍ are coupled together in a system in which the sections 10ᵃ and 10ᵇ extend along the lower portions of angularly related walls 43 and 44 with a convenience outlet 23 mounted on the section 10ᵃ and with an elbow connector 35 coupling the sections 10ᵃ and 10ᵇ. The sections 10ᵇ and 10ᶜ are connected by an edgewise-angled connector shown in Figures 14 and 15 in which 61 designates a bottom plastic or other insulating block having metallic sockets 62 and electrical conductors 63 embedded therein with binding screws 64, to hold the conductors 11 of the conduit sections 10ᵇ and 10ᶜ in the sockets 62. The installation is covered and protected by a similarly angled top block 65 of plastic or other insulating material held to the bottom block 61 by screws or other fastenings 66.

Returning to Figure 1 the ceiling is also shown an elbow 35 which connects the vertical conduit to the horizontal ceiling conduit 10e which terminates in a drop light fixture 45. The section 10g extends horizontally above the door to a door light or other fixture 46. This section 10g is at right angles to the sections 10c and 10d and is coupled to the conductors of the latter sections by a T-connector, the top block of which is indicated at 47. (See Figures 16 and 17.) This top block 47 is affixed by screws or other fastenings 48 to the bottom block 49. In the bottom block are carried pairs of vertical sleeve shields or conductor sockets 50 and 51 exposed at the upper and lower ends of the T-connector to receive the conductors 11 of the conduit sections 10d and 10c in which such conductors are held by binding screws 52. The sockets 50 and 51 are connected by the separate conductors 53. Other conductors 54 in the horizontal branch 55 of the bottom insulating T-block 49 connect with conductors 53 and with the conductor sockets 56 positioned to receive the conductors 11 from the conduit section 10g.

Referring to Figure 19, 102 represents a conduit constructed in accordance with the present invention one end of which is connected to a pot-head 57 which receives the surface entrance conductors 58 and the other of which is connected to a meter 59. This outside installation is shown on a building 60.

Referring more particularly to Figures 20, 21 and 22, plastic sections 10j and 10k of a conduit according to the invention are provided with a three-wire system with the arrangement for overhead installations in which the conduit may be supported from beams 67 by brackets or hangers 68. A connector and convenience insulating block 69 is provided with sockets 70 and conductors 71 for plug-in with the conductors of the sections 10j and 10k. The conductors 71 are joined by the leads 72 of a take-off cable 73. A cover clamp 74 of plastic or other insulating material is fastened about the joint made by the connector 69 and cable 73. Similar convenience outlets may be provided for the fluorescent or other fixture 75.

Figure 24:
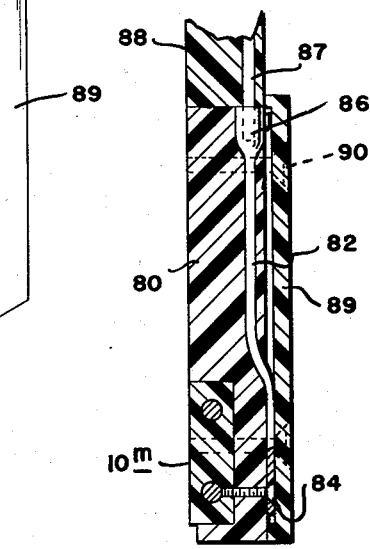
Figure 24 is a longitudinal vertical sectional view taken on the line 24—24 of Figure 23.

Referring more particularly to Figures 23 and 24 the conduit 10m is shown as receiving a straight run adapter 80 having conductor bars or the like 81 and 82 with screw sections 83 and 84 to the conductors of the conduit or moulding 10m and with sockets 85 and 86 for receiving the conductors 87 of a plug-in connection 88. A cover plate 89 may be affixed by screws or other fastenings 90 over the adapter 80. This device is useful where it is desired to tap current from horizontal to vertical, or vice versa. The same arrangement may be applied in Figures 3 and 4 in power outlet example.

The same type of connection may be made for right or left angles.

Figure 25:
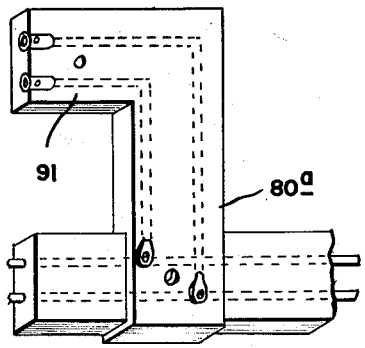
Figure 25 is a similar view showing one form of angled connection.

As shown more particularly in Figure 25 a similar adapter 80a is applied to the moulding in the same manner as illustrated in Figures 23 and 24 but in this case the outer end of the adapter has an extension 91 at an angle of 90° or at any other angle desired, and it will be understood that this extension may project to the left or to the right of the adapter and that it is adapted to receive conductors from a plug similar to the plug 88 in Figure 23.

Figure 26:
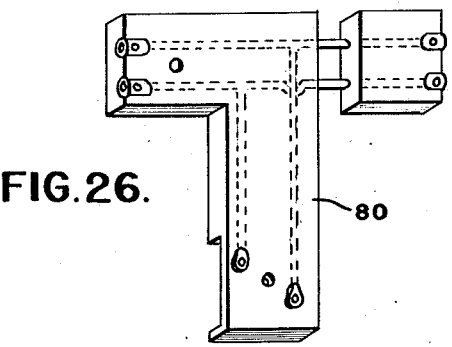
Figure 26 is a view of an angle power take-off device with an adapter.

In Figure 26 the adapter 80b is either an angle or T. All adapter bodies will be made of plastic or other suitable insulating material and will preferably be provided with suitable cover such as the cover 89 in Figure 23.

In connection with Figures 3 and 4 it will be understood that in addition to provision made for applying power outlet, a T-fitting or angle connector may be applied in the same manner or a straight run of moulding in like fashion. Wherever moulding comes to an end without a fitting or outlet box the same shall be equipped with a dead end cover.

It will be understood that the improved wiring system can be prefabricated and the following claims are made for the same.

A wiring system of fused feeders that can have branch circuits at point of use.

A wiring system and devices that enables a rapid and mechanical installation.

A wiring system that is not affected by most acids, oils, or corrosive fumes.

A wiring system that is designed to withstand a reasonable amount of mechanical injury.

Although I have disclosed herein the best form of the invention known to me at this time, I reserve the right to all such modifications and changes as may come within the scope of the following claims.

What I claim is:

1. A wiring system of conductors comprising a pair of separated bare wires, a molding of frangible insulating material in which said separated bare wires are embedded, said molding having transverse scorings at intervals to provide planes of weakness for cleavage or breakage to expose the ends of the wires for further extension, said molding including integral current tap-off sections having screw tap-off sockets opening through the outer surface of the molding and opening inwardly to the respective bare wires, said sections also having other intermediate screw sockets offset from said wires, insulating bottom blocks applicable selectively to said tap-off sections and having tap-off holes adapted to register with said screw tap-off sockets and also having intermediate holes adapted to register with said intermediate screw sockets, said bottom blocks having flanges adapted to engage an edge of said molding to orient said tap-off holes of the bottom blocks with said respective screw tap-off sockets of the tap-off sections, electrical conductors on said blocks, screws for holding said conductors to said blocks adapted to be entered through said tap-off holes and into said tap-off screw sockets into engagement with said bare wires embedded in said molding, insulating covers for said blocks and for said conductors, and screws for holding said covers to said blocks entered through said intermediate holes and into said intermediate screw sockets of the molding, said molding also having openings therethrough for the reception of fastenings to attach the molding to a support.

2. A wiring system of conductors comprising a pair of separated bare wires, a molding of frangible insulating material in which said separated bare wires are embedded, said molding having transverse scorings at intervals to provide planes of weakness for cleavage or breakage to expose the ends of the wires for further extension, said molding including integral current tap-off sections having screw tap-off sockets opening through the outer surface of the molding and opening inwardly to the respective bare wires, insulated bottom blocks adapted to be applied selectively to said tap-off sections and having tap-off holes adapted to register with said screw tap-off sockets, said bottom blocks also having flanges adapted to engage an edge of said molding to orient said tap-off holes of the bottom blocks with said respective screw tap-off sockets of the tap-off sections, electrical conductors in said blocks, screws for holding said conductors to said blocks adapted to be entered through said tap-off holes and into said tap-off screw sockets into engagement with said bare wires embedded in said molding, insulated covers for said blocks and for said conductors, means for holding said covers to said blocks, said molding also having openings therethrough to receive fastenings whereby to attach the molding to a support.

3. A wiring system of conductors comprising at least a pair of separated bare wires, a molding of frangible insulating material in which said separated bare wires are embedded, said molding having transverse scorings at intervals to provide planes of weakness for cleavage or breakage to expose the ends of the wires for further extension, said molding including integrally therewith current tap-off sections having screw tap-off sockets opening through the outer surface of the molding and opening inwardly to the respective bare wires, insulating bottom blocks adapted to be applied selectively to said tap-off sections of the molding and having tap-off holes adapted to register with said screw tap-off sockets, said bottom blocks having parts adapted to engage an edge of said molding to aline said tap-off holes with said respective screw tap-off sockets of the tap-off sections, electrical conductors on said blocks, binding screws for holding said conductors to said blocks adapted to be entered through said tap-off holes and in the said tap-off screw sockets into engagement with said bare wires, insulating covers for said blocks and for said conductors, and fastenings for holding said covers to said blocks.

4. A wiring system of conductors comprising a molding of plastic frangible insulating material, a pair at least of bare wires embedded in said plastic molding and extending longitudinally thereof spaced from one another, said molding having transverse scorings at intervals providing planes of weakness for cleavage or breakage to expose the ends of the wires for further extension, said molding having included therein integral current tap-off sections having screw tap-off sockets opening outwardly through the outer surface of the molding and opening inwardly to the respective bare wires, insulating blocks adapted to be applied selectively to said tap-off sections and having tap-off holes adapted to register with said screw tap-off sockets, said blocks having means for engaging a part of said molding to register said tap-off holes with said resspective screw tap-off sockets of the tap-off sections, electrical conductors on said blocks, and screws passed through said conductors adapted to be entered through said tap-off holes and into said tap-off screw sockets into electrical engagement with said bare wires for mechanically holding the conductors to said blocks.

5. A wiring system of conductors comprising a pair at least of separated bare wires, a molding of frangible insulating material in which said separated bare wires are embedded, said molding having transverse scorings at intervals to provide planes of weakness for cleavage or breakage to expose the ends of the wires for further extension, said molding including integral current tap-off sections having tap-off sockets opening through the outer surface of the molding and opening inwardly to the respective bare wires, insulating blocks adapted to be applied selectively to said tap-off sections and having tap-off holes adapted to register with said tap-off sockets, said blocks also having means adapted to engage a part of said molding to cause registration of said tap-off holes with said respective tap-off sockets of the tap-off sections, electrical conductors on said blocks and fastenings passing through said conductors and through said tap-off holes and through said tap-off sockets into electrical engagement with said bare wires and means for interlocking said fastenings with said molding to mechanically hold the conductors to said blocks and said blocks to said molding.

CARL A. NAUGHTON.

REFERENCES CITED

The following references are of record in the file of this patent:

UNITED STATES PATENTS

| Number | Name | Date |
| --- | --- | --- |
| Re. 14,950 | Hessel | Sept. 21, 1920 |
| 1,192,982 | Bristol et al. | Aug. 1, 1916 |
| 1,952,554 | Lavarack | Mar. 27, 1934 |
| 2,110,513 | Toelke | Mar. 8, 1938 |
| 2,175,144 | Davidson | Oct. 3, 1939 |
| 2,218,545 | Morton | Oct. 22, 1940 |
| 2,267,080 | Clayton | Dec. 23, 1941 |
| 2,358,346 | O'Brien | Sept. 19, 1944 |
| 2,408,443 | O'Brien | Oct. 1, 1946 |
| 2,413,032 | O'Brien | Dec. 24, 1946 |
| 2,450,908 | O'Brien | Oct. 12, 1948 |
| 2,495,280 | O'Brien et al. | Jan. 24, 1950 |
| 2,544,180 | Richards | Mar. 6, 1951 |

FOREIGN PATENTS

| Number | Country | Date |
| --- | --- | --- |
| 565,091 | France | Nov. 3, 1923 |
| 934,503 | France | Jan. 10, 1948 |